Oct. 27, 1970   K. VOSSEN   3,535,738
DIEHEAD CLAMPING MEANS FOR EXTRUDERS
Filed March 20, 1968   5 Sheets-Sheet 1

Fig.1.

INVENTOR.
KARL VOSSEN
BY Norbert P. Holler
ATTORNEY

Fig. 2.

INVENTOR.
KARL VOSSEN
BY Norbert P. Holler
ATTORNEY

United States Patent Office 3,535,738
Patented Oct. 27, 1970

3,535,738
DIEHEAD CLAMPING MEANS FOR EXTRUDERS
Karl Vossen, Aachen, Germany, assignor to Uniroyal Englebert Deutschland AG, Aachen, Germany, a corporation of Germany
Filed Mar. 20, 1968, Ser. No. 714,669
Claims priority, application Germany, Mar. 28, 1967, 1,729,618
Int. Cl. B29f 3/04
U.S. Cl. 18—12
19 Claims

ABSTRACT OF THE DISCLOSURE

Diehead clamping means for extruders of the class having at the machine head an openable diehead structure composed of one movable member and one stationary member. The high clamping forces drawing the movable member against both the stationary member and the machine head are exerted on a pair of lateral lugs of the movable diehead member through respective arms which in the operating position are oriented in approximately the direction of the resultant of the extrusion pressure-created forces tending on the one hand to separate the movable diehead member from the machine head and on the other hand to separate the movable diehead member from the stationary one. In order to permit the movable diehead member to be shifted out of its closed or operating position for purposes of cleaning, die replacement, etc., means are provided for pivoting the clamping arms laterally outwardly of the diehead structure after they are released from the lugs. For ease and uniformity of application of the clamping forces and minimization of frictional wear on the clamping system during the releasing and tightening thereof, double-acting hydraulic piston and cylinder combinations may be connected into the respective force transmission paths extending via the arms from the movable diehead member to either the stationary member or the machine head.

---

The foregoing abstract is not to be taken either as a complete exposition or as a limitation of the present invention, and in order to understand the full nature and extent of the technical disclosure of this application, reference must be had to the following detailed description and the accompanying drawings.

This invention relates to extrudes of the class in which there is provided an openable diehead structure composed of one movable member and one stationary member, and in particular to a novel class of clamping arrangements for such a diehead structure.

An openable diehead structure for an extruder commonly is used when the diehead structure is one which must be thoroughly cleaned, either whenever the compound to be extruded is being changed, or upon interruption or conclusion of an extrusion operation, in order to ensure that no residues of the previous stock remain. Especially in the processing of rubber and similar materials, these residues would scorch in the hot diehead structure and would ultimately cause troubles in the extruder operation. Since the cleaning of a one-part diehead structure which is not openable is very difficult, especially in these cases, the use of the above-mentioned openable diehead structures has come into vogue.

In the known two-part openable diehead structures, however, various difficulties arise, especially upon the exertion of very high pressures in the extruder during the extrusion process. In a diehead with an outlet or die opening 400 mm. wide, for example, such as is involved in extruding tread strips for vehicle tires, pressures of 70 tons and over can arise. This makes it essential that the creation of any gap in the seating surfaces of the two parts of the diehead structure be avoided, since otherwise an accurate extrusion of the thread true to dimensions is impossible. Even a gap of 0.1 mm. is considered unallowable.

An openable diehead structure is known in which the movable member thereof is firmly pressed together with the machine head as well as with the stationary member of the diehead structure by means of screw bolts. In view of the possible elongation of the bolts, these must be tightened down so strongly that the initial stress which occurs is greater than the tensile stress in the bolt shaft generated at the maximum extrusion pressure. The screw bolts must, therefore, be tightened down very strongly for a high internal pressure in the diehead. Thus, the frictionel forces to be overcome on the bearing surfaces and in the threads of the nuts are very high.

Practice has shown that by reason of these high frictional forces, a high wear and a premature abrasion of the bolts occurs, since these are loosened not only once, but rather repeatedly as one distinct extrusion operation follows another, and each time must be tightened up again. Practice has also shown that is difficult to tighten the bolts as uniformly as is necessary in order to achieve a sufficiently uniform pressure on the sealing surfaces. Frequently the bolts are tightened too little or too non-uniformly. A further substantial disadvantage of this known diehead structure also lies in the fact that the loosening and the subsequently required careful retightening of the screw bolts with the necessary force and with the greatest possible uniformity is time-consuming, especially as a large number of screw bolts are involved in the said known diehead structure. In this way, however, the advantage of easier cleaning offered by the openability of the diehead is largely lost again, since it must be gained at the cost of a considerable expenditure of time and labor in releasing and retightening the screw bolts holding the diehead structure together.

In another known openable diehead structure, both the upper and the lower (i.e. the movable and the stationary) members thereof are provided with lugs on both sides over which respective yokes are pushed. The yokes and the lugs have conical bearing surfaces. If the yokes are tightened down by means of screws in the direction of the diehead, they press the two parts of the head firmly against one another. In this known construction, it is true, the number of bolts to be screwed down is reduced. Nevertheless, the bolts which serve to press the movable diehead member tight against the machine head are still needed as before. Also, in the pressing of the yokes onto and off the lugs, in turn, considerable frictional forces result, which with the frequent loosening and retightening lead to premature wear. The frictional forces furthermore make a uniform tightening down of the yokes and testing of the tightening for uniformity much more difficult. It should be borne in mind here that in view of the high internal pressures in the diehead structure, the yokes must also have a correspondingly very high mechanical pre-stress. In all cases this involves considerable forces, which can be overcome in a satisfactory manner only with difficulty in the known constructions.

A hydraulically operated slide lock serving for clamping elements of an extruder has also become known. This, however, serves only for fastening the movable member of the diehead structure to the machine head. The movable and stationary members of the diehead structure must previously be fastened together by bolts. Thus this known construction too provides no decisive advantage.

In the solution of the problems to which the present invention is directed, the starting point is taken to be the second of the known diehead designs mentioned above, i.e. the one in which the diehead members have lugs on both sides over which the yokes acting as clamps are pushed, the yokes are tightened down by screw bolts, and the pressing of the movable member of the diehead structure against the head of the machine likewise is effected by means of screw bolts.

The basic objective of the present invention is, therefore, to provide a novel design of the diehead structure clamping means, utilizing the known designs mentioned as a foundation, in such a way that the disadvantages of the known constructions, especially the disadvantages described above, are effectively avoided. In particular, it is an object of the invention that the number of screw bolts used for the clamping action are to be greatly reduced. In this way, on the one hand, the expenditure of labor and time in releasing and reclamping the movable member of the diehead structure is reduced, and, on the other hand, the creation of non-uniform pressing forces, which is almost unavoidable in the strong tightening of a large number of screw bolts, is prevented. Over and above this, it is an object of the invention to provide such clamping means through which the occurrence of frictional forces in the clamping operation can be prevented insofar as possible, so that on the one hand the friction-caused non-uniformities in the clamping forces and on the other hand the related premature wear of a large number of machine elements, are avoided. Yet another object of the invention is the provision of suitable constructions of this class and further developments thereof, such as are described below, in such a way as to yield special advantages.

For the purpose of attaining these objectives, the diehead structure according to the present invention is characterized by an oblique orientation of the releasable clamping yokes, when in the operating position, in about the direction of the resultant of the extrusion pressure-created separating forces arising between the movable diehead member and the head of the machine on the one hand and between the movable and stationary diehead members on the other hand.

Through this oblique orientation, it is possible to dispense with the screw bolt connection which has heretofore been used for effecting the tightly sealing pressing of the movable member of the diehead structure against the head of the machine. This tightly sealing pressing action is now achieved by the clamps. Furthermore, as regards the tightly sealing pressing of the movable diehead member against the stationary diehead member, at least the same advantage is afforded by the clamps, namely, that the use of screw bolts for this part of the releasable pressing connection can also be dispensed with. Thus, the diehead structure according to the present invention, as it is characterized above, has at least the advantage that the total number of clamping bolts for effecting the tightly sealing pressing action can be reduced still further. Other characteristics of the invention which make possible a further more extensive reduction in the number of clamping bolts will be set forth hereinafter.

The determination of the direction of the resultant of the aforesaid pressure-created separating forces arising on the one hand between the movable diehead member and the head of the machine and on the other hand between the movable and stationary diehead members will, of course, depend on the existence of the same or different specific pressing forces in the two directions. The specific pressure, i.e. the separating force component, acting between the movable member and the head of the machine can be identical with the specific pressure or force component acting between the movable and stationary members of the diehead structure. However, it can also be higher or lower. The direction of the oblique orientation of the clamps is governed accordingly by this relationship.

A special embodiment of the diehead structure according to the invention is characterized by an oblique orientation of the clamps, when in the operating position, in about the direction of the resultant of the internal extrusion pressure-created force components acting in specified directions bearing predetermined relationships to the orientations of the sealing surfaces. Since the orientation of the said resultant, depending on the choice of the force component directions used as a basis, may vary over an angular range, the oblique orientation of the clamps in about the direction of the resultant of the internal pressure force components occurring in operation considered in reference to the orientations of the sealing surfaces basically has the advantage that a very high degree of balancing or equalization of the overall forces is effected.

An advantageous further development of the diehead structure according to the invention is characterized by an added obliquity of the orientation of the clamps relative to the aforesaid resultant in such a manner as to avoid a self-locking action at the sealing surfaces between the movable and stationary diehead members during the clamping operation. This will be understood from the following.

Due to the basic oblique orientation of the clamps, during the tightening of the same there results a certain sliding movement especially between the sealing surfaces of the movable and stationary members of the diehead. Depending on the position of the aforesaid resultant, either this sliding movement may take place without difficulty, or the danger of self-locking will arise which may lead to the result that with further clamping, although the sealing surfaces of the movable diehead member are pressed more and more firmly against the sealing surfaces of the stationary diehead member, nevertheless the necessary contact pressure between the sealing surfaces of the movable member and the sealing surfaces of the machine head is achieved only with difficulty or not at all. For such eventualities, the aforesaid added obliquity of the orientation of the clamps ensures that the above-mentioned self-locking action is effectively avoided.

In a refinement of the diehead structure according to this aspect of the invention, the oblique orientation of the clamps is chosen to be in about the direction of the resultant of the above-mentioned internal pressure forces in reference to the locations of the sealing surfaces and the frictional forces between the movable and stationary diehead members arising by virtue of the clamping action. With the oblique orientation of the clamps in the direction of this overall resultant, a complete balancing or equalization of forces and an optimum utilization of the structural elements used is achieved.

The diehead clamping system according to the present invention may be further refined, to the end of attaining the declared objects hereof, by the connection of respective tensioning devices operated by the admission of a fluid pressure medium, into the two power transmission paths which extend from the movable member of the diehead structure via the associated clamps to the machine head or to the stationary diehead member. Tests have shown that a tensioning device operated by the admission of a fluid pressure medium is capable of applying the hereinbefore described very high clamping forces. By connecting such tensioning devices into the aforesaid power transmission paths, each corresponding clamp or yoke acts purely as a tensile element, and no clamping bolts are required in order to press the movable diehead member against the stationary one. This results in the absence of any abrasion wear in these clamping elements. Besides this, the forces exerted by a pressure-operated tensioning device can easily be regulated, so that the ultimate clamping force can be adapted to the particular conditions involved. Moreover, it is possible to act on a plurality of tensioning devices of this type in a fully uniform manner, so as to ensure a high degree of uniformity of the contact pressures for the different sealing surfaces.

It will be clear, of course, that if an extruder of the openable diehead type were to be equipped with pressure-operated clamps which are not disposed in the above-described oblique orientation, for example as in the third of the known constructions referred to hereinbefore, the use of screw bolts and tensioning devices subject to abrasion wear would be avoided only insofar as they serve for the clamping of the movable diehead member against the stationary member. In other words, although this alone presents a considerable advantage over the known openable diehead designs described above, with non-obliquely oriented clamps the screw bolts which serve for the clamping of the movable diehead member against the head of machine are not eliminated. Through the combination of the oblique orientation of the clamps with the connection of the pressure-operated tensioning devices into the respective power transmission paths, therefore, the advantage is offered that all of the bolts which conventionally serve for clamping the movable diehead member to any stationary part whatever in the known extruders, can be eliminated. The use of construction elements subject to abrasion wear is thereby entirely avoided.

The connection of pressure-operated tensioning devices into the power transmission paths as aforesaid affords a number of different constructional possibilities. A particularly advantageous embodiment thereof is characterized by the interconnection of the tensioning devices between the machine head or the stationary diehead member and the respective clamps. In this regard, since the stationary member of the diehead structure is fastened onto the machine head, the choice of whether to connect the tensioning devices to the machine head or to the stationary diehead member essentially will depend in any given case on the advantages, e.g. in terms of space availability or utilization, etc., which may be afforded by the respective arrangements.

One advantageous refinement which may be incorporated in a diehead clamping system according to the invention as above characterized is the provision of a joint or hinge connected in front of or behind each tensioning device to enable the clamps to be swung or pivoted laterally of the diehead structure toward and away from the movable member thereof. The advantage of this arrangement is that thereby the releasing of the clamps to open the diehead structure is possible in a particularly easy way. Swinging the clamps back in for clamping is likewise possible in a simple way.

In an advantageous further development of the foregoing, at least one control bar structure is provided for enabling a controlled sidewise outward swinging or pivoting of the clamps after their release and thereafter a return pivoting of the clamps preparatory to the tightening thereof. The presence of such a control bar structure makes it possible to dispense with any manual operation. The control bar structure may be in the form of a fluid pressure-operated piston and cylinder combination, or in the form of an articulated link or lever system producing a toggle or elbow lever action, or the like, if necessary accompanied by the provision of slots for delaying the movement and/or springs for promoting the movement of the clamps in the lateral directions.

A further advantageous embodiment of the extrusion diehead clamping system according to the invention is characterized by a self-locking design of the bearing area of each lug on the movable diehead member and the associated bearing area of the respective clamp, for example through the provision of a set screw having a spherically curved or ball-shaped tip adapted to mate with a correspondingly curved socket during clamping. The self-locking construction can, alternatively, be achieved by slightly undercutting or inclining the said bearing areas. It should be understood that the aforesaid set screw has nothing to do with the clamping screw bolts mentioned hereinbefore. The set screw is not adjusted during the clamping operation, and at other times only when necessary to compensate for any amount of wear that may have occurred in prolonged operation of the extruder. Practice has shown, however, that such set screws are actually not indispensable and that their function can be carried out by a fixed bearing member.

In accordance with the present invention, each clamp may be in the form of a U-shaped bail or yoke arranged so that in the clamping position its closed free end envelops the associated lug. Alternatively, each clamp may be in the form of a bow having a laterally outward curvature, i.e. concave toward the diehead, and further having at its free end a hook portion pointing inwardly, i.e. toward the movable diehead member.

The tensioning device for each claim is, according to the invention, preferably in the form of a cylinder and piston, the piston rod of the latter having a swivel connection associated therewith at its outer end which serves as an articulated joint to make possible the aforesaid lateral outward swinging of the clamp. Advantageously, a double-acting piston and cylinder combination is used, a first cylinder connection preferably to the piston bottom side serving for the delivery of a high-pressure medium for tightening the clamp, and a second cylinder connection preferably to the piston rod side serving for the delivery of a low-pressure medium for releasing the clamp.

It will be understood that the high-pressure medium is delivered to the piston bottom side of the cylinder, where there is no reduction in the surface over which the pressure acts due to the piston rod, since the clamping forces which it must produce require the largest possible piston area. The releasing forces may be much lower, of course, and thus they do not require utilization of the full piston area, i.e the low-pressure medium can be delivered to the rod side of the cylinder since it does not matter very much if the active area is reduced by the extent of the piston rod. Another consideration influencing this choice is that the piston bottom side of the cylinder has a movable seal only at the piston periphery, whereas the piston rod side of the cylinder has movable seals at the peripheries of both the piston and the piston rod, which makes the piston rod side harder to seal against a high-pressure medium than the piston bottom side.

The regulation of the delivery of the high-pressure medium and the low-pressure medium can, of course, be done entirely automatically together with the regulation of the outward pivoting of the clamps, so that any individual manual regulating operations can be dispensed with. Only a button or lever need be operated to initiate the whole operation. Moreover, the regulation of both the high-pressure medium and the low-pressure medium can be done in a very uniform way, especially by connecting the two cylinders in parallel to the pipelines for the respective pressure media. The laying of the pipelines can even be done symmetrically, so that the same flow resistance is created in both parts thereof, in order to ensure that all movements at the opposite sides of the extruder coincide. Nothing like this in the way of simplified handling can be achieved with the above-described known diehead clamping designs.

The cylinders of the diehead clamp tensioning devices according to one aspect of the invention may be rigidly secured to side plates which are fixed to the machine head or the stationary member of the diehead structure, the cylinders being arranged in such a way that the piston rods point away from the movable member of the diehead structure, and the outside ends of the piston rods being articulated by means of the swivel connections to the non-free ends of the clamps. In accordance with another aspect of the invention, the cylinders may be rigidly connected to the non-free ends of the clamps in such a way that the piston rod points toward the movable member of the diehead structure, the outside ends of the piston rods being articulated by means of the swivel connections to the machine head or the stationary member of the diehead structure.

The extruder, in accordance with a further development of the invention, is provided with an additional pressure-operated mechanism for effecting the raising and lowering of the movable diehead member when the clamps are released. This mechanism makes it unnecessary for such raising and lowering operations to be effected by manual labor. Advantageously, the stationary member of the diehead structure is the lower one and the movable member is the upper one. This arrangement enables the tensioning devices for the clamps in general to be conveniently placed in the vicinity of the lower diehead member. In special cases, however, the reverse arrangement can be of significance, as when certain spatial conditions dictate or make it advisable to place the stationary member above the movable member.

The foregoing and other objects, charcateristics and advantages of the present invention will be more clearly understood from the following detailed description thereof when read in conjunction with the accompanying drawings, in which.

Figure 1:
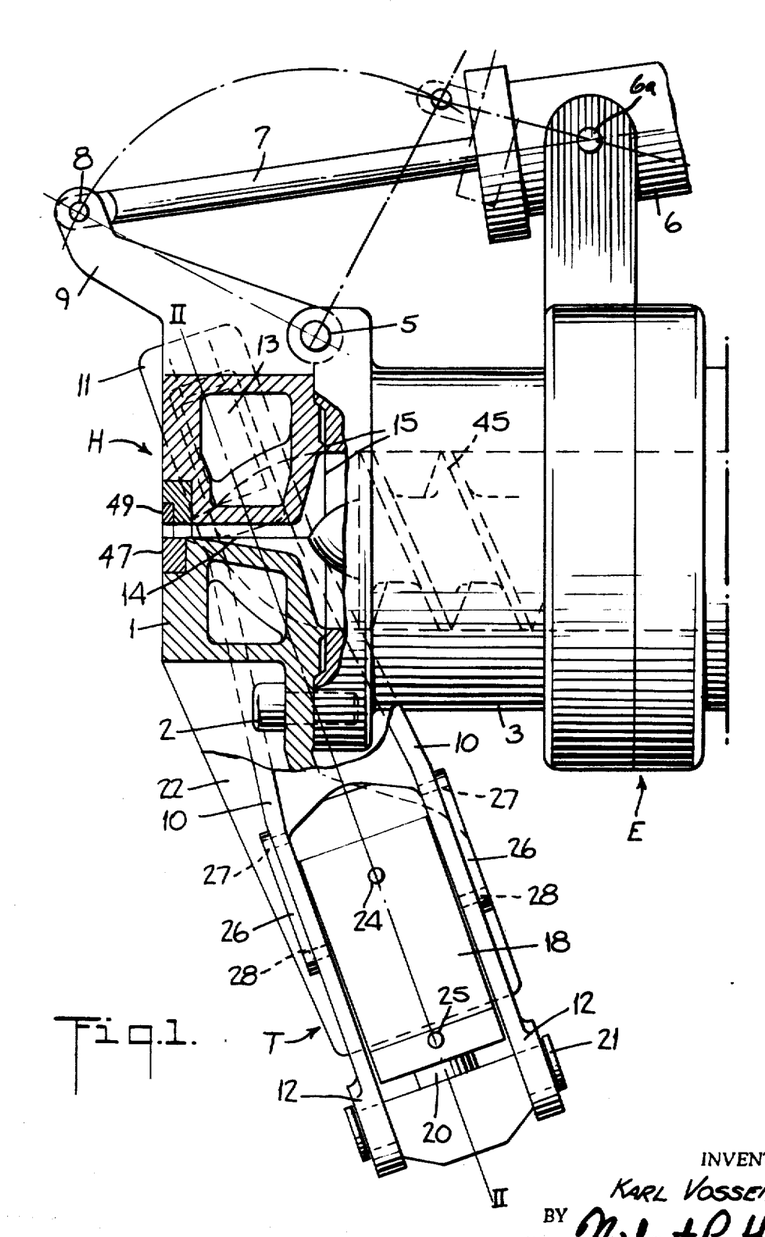
FIG. 1 is a fragmentary, partly sectional, side elevational view of the front end of an extruder equipped with an openable diehead structure and with a clamping arrangement therefor constructed in accordance with one embodiment of the present invention, the movable diehead member being illustrated in its closed position.
Figure 2:
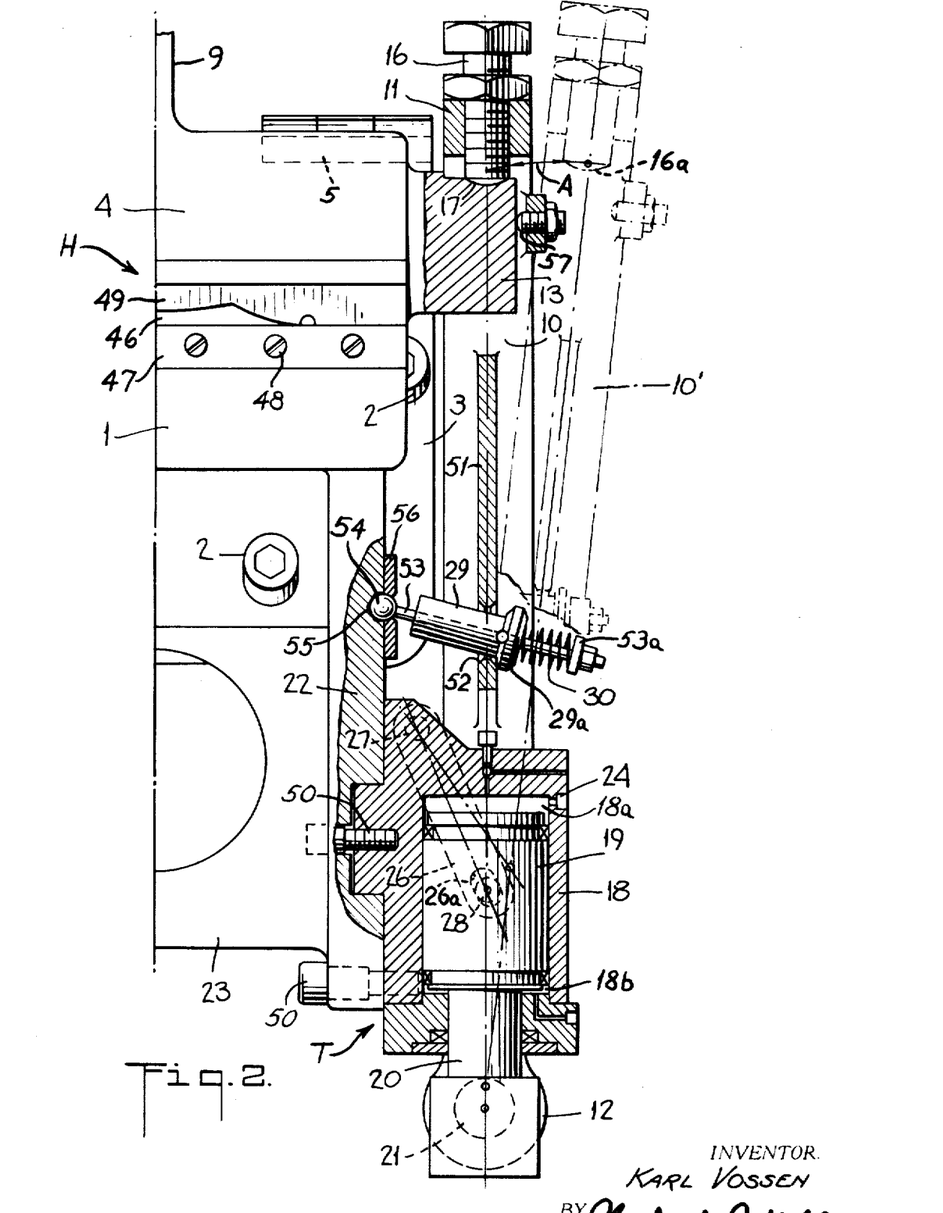
FIG. 2 is a fragmentary, partly sectional, front elevational view of the extruder, the view being taken along the line II—II in FIG. 1.
Figure 3:
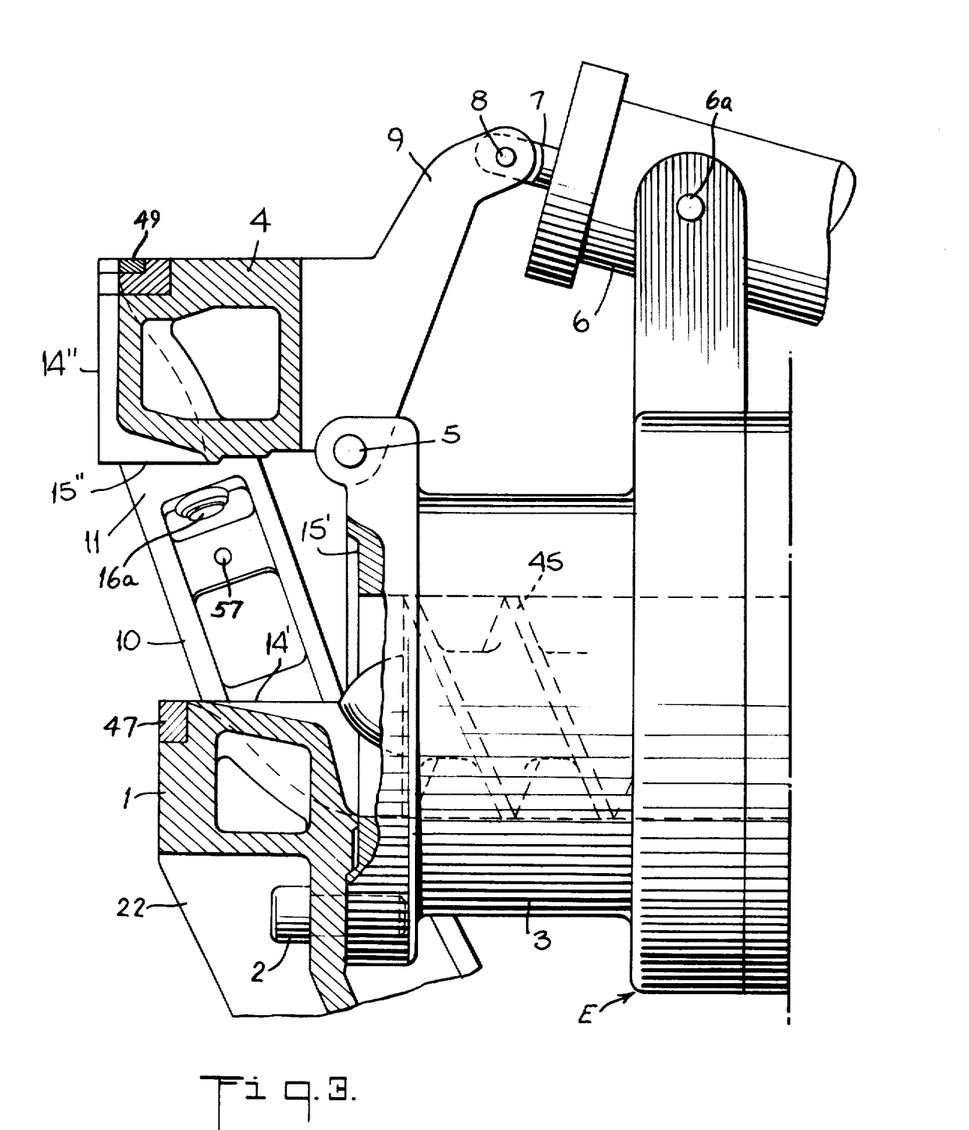
FIG. 3 is a fragmentary, partly sectional, side elevational view of the extruder shown in FIGS. 1 and 2 and illustrates the movable diehead member in its opened position.

Referring now first to FIGS. 1 to 3, the lower member 1 of the diehead structure H of an extruder E is shown as being fastened by means of screw bolts 2 to the machine head 3. The bolts 2 are normally not designed to be released. The upper member 4 of the diehead H is pivotally mounted by hinge means 5 on the machine head 3 for reciprocal angular movement between its closed (FIGS. 1 and 2) and opened (FIG. 3) positions under the action of a fluid pressure-operated mechanism including a double-acting cylinder 6 rockably supported at 6a on the machine head 3 and having a piston (not shown) the rod 7 of which is articulated at 8 to a lever arm extension 9 of the movable diehead member 4. The cylinder and piston combination 6–7 serves solely for the raising and lowering of the upper diehead member 4 but not for the clamping of the latter.

The diehead structure H defines the extrusion and shaping orifice 46 of the extruder, this orifice in the illustrated form having the contours of a vehicle tire tread strip and being defined between a lower straight-edged die element or wear plate 47 fixed by screws 48 to the stationary diehead member 1, and an upper replaceable profiled die element 49 carried by the movable diehead member 4. The profiled die element 49 is normally retained on the member 4 and releasably locked thereto by a special slide lock mechanism which, since per se it constitutes no part of the present invention, will not be described or illustrated herein.

The clamping arrangement at each side of the diehead structure H for pressing the respective parting line surfaces of the movable diehead member 4 at 14 and 15 (FIG. 1) against the corresponding surfaces of the stationary member 1 and the machine head 3 with tight sealing, comprises a generally U-shaped yoke or bail 10 the closed and free end section 11 of which is adapted to surround or envelop the respective lug 13 extending from the side of and preferably integral with the movable upper member 4 of the diehead. At their opposite ends, the arms of the clamp 10 terminate in respective eyes or bearing sleeves 12 to which the tensioning device T for the clamp is articulated, as will be more fully described presently. At its closed end 11, the clamp 10 carries an adjustable set screw 16 (not shown in FIG. 1) the tip 16a of which protrudes into the space between the clamp arms and is generally spherically curved or ball-shaped so as to be able to mate with and seat solidly in a correspondingly curved depression or socket 17 in the upper surface of the lug 13.

As clearly indicated in FIGS. 1 and 3, the clamps 10 are oriented obliquely relative to the line of action of the extruder screw 45 and in a direction angled away from the latter as viewed along the clamps from their open toward their closed ends. It will be understood, therefore, that when the clamps are in their operating positions, indicated in solid lines in FIG. 2, and subjected to tension forces directed obliquely downwardly, these are transmitted through the set screws 16 to the lugs 13 and thus to the upper diehead member 4. The latter is thereby pressed home with tight sealing at both of the parting line surfaces 14 and 15, the former being defined by the upper surfaces 14' of the stationary diehead member 1 and the lower surfaces 14'' of the movable diehead member 4, and the surfaces 15 being defined by the vertical front surfaces 15' of the machine head 3 and the rear surfaces 15'' of the movable diehead member 4. The "horizontal" sealing surfaces 14 may, if desired also be inclined obliquely to the horizontal. Depending on the obliquity of the orientation of the clamps 10, of course, the tightening on the sealing surfaces 14 and 15 produces vertical and horizontal pressing forces whose ratio to one another will vary accordingly. Preferably, predetermined pressure forces, which can be arrived at by calculation or experimentally and will approximate (and for safety exceed) the vertical and horizontal components of those to be encountered in an extrusion operation, are taken as a basis, and then the oblique orientation of the clamps required to counteract these forces is determined from the ratio thereof to one another. Based upon these determinations, the permanent required oblique orientation of the clamps can then be established.

The tensioning device T for each of the clamps 10 to produce the high clamping forces required comprises a double-acting fluid pressure cylinder 18 and a large diameter piston 19 therein the rod 20 of which, in the embodiment of the invention illustrated in FIGS. 1 to 3, extends in the direction away from the movable diehead member 4 and at its outer end is articulated to the ends of the arms of the associated clamp by means of a wrist pin or pivot bolt 21 journaled in the bearing eyes 12 of the clamp arms. The elements 12 and 21, the relative arrangement of which could be reversed, constitute the hereinbefore mentioned swivel connection. The cylinder 18 is rigidly fastened, as by bolts 50, to a side plate 22 which in turn is fixed to the stationary or lower member 1 of the diehead structure H. To absorb the flexural forces which will arise in operation, plates 22 are reinforced by a suitable ribbed stiffening plate arrangement 23.

For the purpose of activating the tensioning devices T in one direction or the other, i.e. for tightening or releasing the clamps 10, each cylinder 18 is provided with two connections or ports 24 ad 25, the former opening into the piston bottom end 18a of the cylinder for delivery of a high-pressure medium, and the connection 25 opening into the piston rod end 18b of the cylinder for delivery of a low-pressure medium. Both pressure media are preferably an incompressible liquid such as oil.

It will be readily understood from the foregoing that, assuming the clamps 10 to have been preliminarily moved out of their "release" positions, shown in broken lines and designated 10' in FIG. 2, and into overlying relation to the lugs 13, when the high-pressure medium is admitted into the cylinders via the ports 24, the pistons 19 are first moved downwardly somewhat, which movement is transmitted to the clamps 10 by way of the wrist pins 21 and swivel eyes 12 to bring the tips 16a of the set screws by a likewise generally linear movement into contact with the sockets 17 on the lugs 13, as shown in solid lines in FIG. 2. Upon further delivery of the high-pressure medium, the tensional force on the clamps 10 and the pull on the lugs 13 increases. As a result, first there is a certain movement of the movable upper diehead member 4, which was already in the closed condition, until said member has reached its final position relative to the sealing surfaces 14 and 15. Thereafter, upon still further delivery of the high-pressure medium, a marked rise in the clamping forces occurs very rapidly, until the necessary or desired pressing forces on the sealing surfaces 14 and 15 are achieved.

For releasing the clamps 10, the pressure on the high-pressure medium is relieved and the low-pressure medium is admitted into the cylinders via the ports 25, whereby the pistons 19 are moved upwardly, forcing the now unpressurized high-pressure medium out of the cylinders via the ports 24.

As previously indicated, means are provided for effecting the lateral inward and outward pivoting movements of the clamps 10 which are required for shifting the clamps toward the movable diehead member 4 preparatory to clamping the same in its closed position, and away from the movable member for releasing the same so as to permit it to be moved into its open position. In respect of the system illustrated in FIGS. 1 to 3, the arrangement is such that the respective pivoting movements occur as automatic concomitants of the downward and upward movements of the clamps under the action of the pistons 19. To this end, there is provided for each clamp a control bar mechanism advantageously comprised of a pair of parallel links or levers 26 (FIG. 1) having a suitably stationary pivot connection 27 at one end, e.g. to the associated cylinder 18, and at the other end a second pivotal connection 28 to the associated clamp 10. At the pivotal connections 28, the links 26 are slotted, as illustrated at 26a (FIG. 2).

The arms of each clamp 10 intermediate their ends further are rigidly connected with a transverse web 51 (FIG. 2) extending therebetween, the web being provided with an opening 52 to accommodate a sleeve 29 having an enlarged peripheral flange or like abutment at its outer end 29a. The sleeve is axially slidably carried by a rod 53 pivotally mounted at one end on the associated side plate 22, for example by means of a ball 54 retained in a suitable socket 55 by an apertured cover plate 56 secured to the side plate 22 by means of bolts or screws (not shown). A compression spring 30 in surrounding relation to the rod 29 is confined between the sleeve end 29a and an abutment 53a on the outer end region of the rod 53.

It will be understood, therefore, that the pivotal connections of the pairs of links 26 as described establish a toggle or elbow lever system between each control bar mechanism and the lower part of the associated clamp 10 extending from the respective pivot joint 28 to the respective wrist pin 21. Accordingly, when the wrist pins 21 are moved upwardly from the position illustrated in FIG. 2 by admission of the low-pressure medium into the cylinder end 18b, the clamps 10 will first move straight up to the extent permitted by the slots 26a so as to enable the spherical lower ends of the set screws 16 to be linearly lifted out of the sockets 17. Thereafter, the elbow lever action comes into effect and the links 26 pivot upwardly about the connections 27 and force the clamps to pivot laterally away from the diehead structure H about the axes of the wrist pins 21. As this takes place, the springs 30, which in cooperation with the respective sleeves 29 and rods 53 define the limits of the outward movements of the clamps, are compressed and thus bias the arms 10 so as to facilitate the inward pivoting thereof when subsequently the wrist pins 21 are moved downwardly by admission of the high-pressure medium into the cylinder end 18a. The extent of inward movement may be additionally limited by adjustable abutment screws 57 (FIGS. 2 and 3) carried by the arms 10 adjacent their free ends 11 for engagement with the lugs 13.

Figure 4:
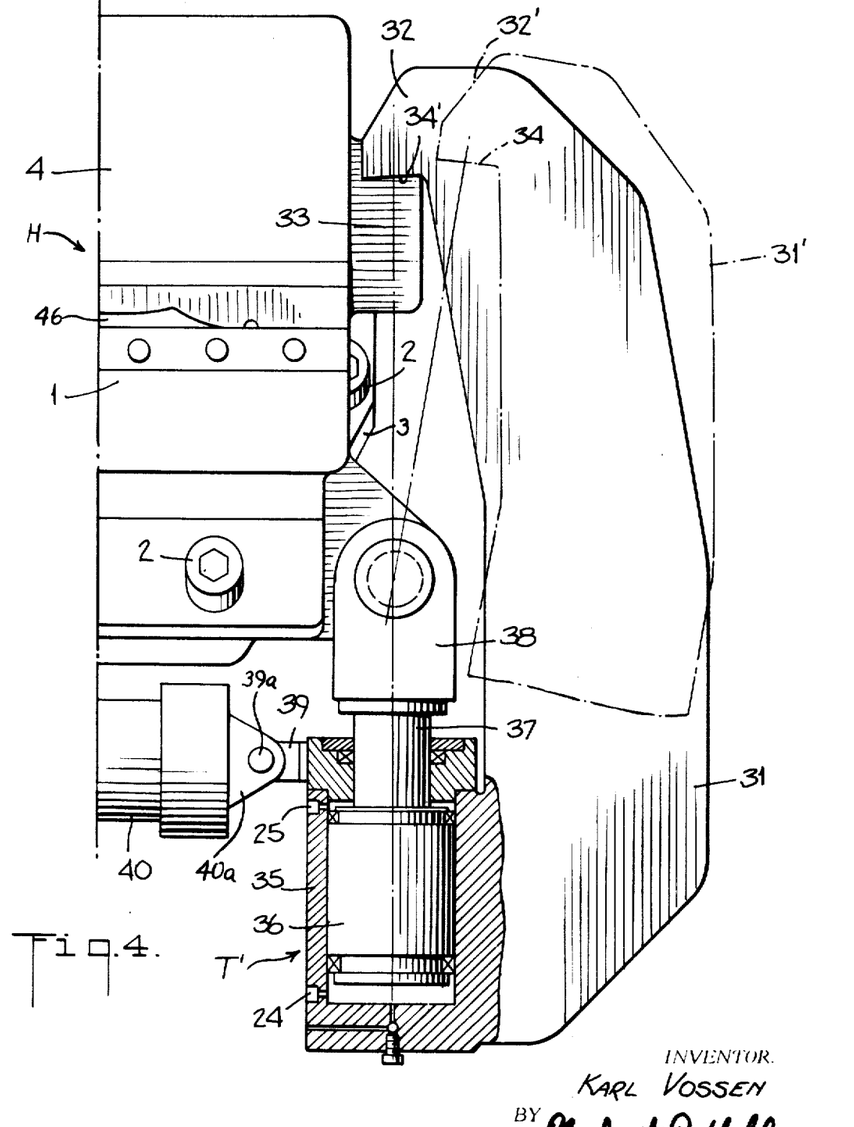
FIG. 4 is a fragmentary, partly sectional, front elevational view, similar to FIG. 2, of an extruder equipped with a diehead clamping arrangement constructed in accordance with another embodiment of the present invention.

Referring now particularly to FIG. 4, the diehead structure H defining the extrusion opening 46 is again shown as comprising a stationary lower member 1 fastened by bolts 2 to the machine head 3, and a movable upper member 4, the construction and arrangement essentially being the same, except as hereinafter set forth, as shown in FIGS. 1 and 2. For this embodiment of the present invention, however, the clamps 31 are constructed in the form of bow-shaped yokes or arms having a laterally outward curvature, i.e. they are somewhat concave toward the movable member 4, and at their free ends respective hook portions 32 turned inwardly, the latter having downwardly facing bearing surfaces 34 adapted to engage and seat on suitably undercut or inwardly inclined bearing surfaces 34' provided on lugs 33 extending from the diehead member 4. As before, the clamps 31 are obliquely oriented in the direction of the resultant of the forces acting at the surfaces 14 and 15, and upon being released can be pivoted out into the broken-line positions 31' to dispose the hook ends as shown at 32'.

The tensioning devices T' for tightening the clamps 31 consist of double-acting cylinders 35 within which are arranged pistons 36 the piston rods 37 of which extend toward the movable diehead member 4 and at their outer ends carry respective swivel eyes 38. Each cylinder 36 is fixedly connected with its associated clamp 31, and each piston rod 37 is articulated by means of its associated swivel eye 38 to the stationary lower member of the diehead. The clamping and releasing operations according to this embodiment of the invention are thus basically the same as those described for the clamps 10 in FIGS. 1 to 3, the only difference being in the fact that the cylinders and pistons have exchanged their roles and that the articulated joints defined by the swivel eyes 38 are now located between the stationary diehead member 1 and the tensioning devices rather than between the latter and the clamps.

The lateral inward and outward pivoting of the clamps 31, however, takes place in a manner somewhat different from that of the clamps 10. In the system of FIG. 4, control bars 39 are provided each of which is connected at one end of the associated cylinder 35 and is articulated at its other end, as at 39a, to an adjunct of a respective operating piston and cylinder combination 40. The articulation obviously can be between the control bar 39 and a lug 40a of the cylinder side, as shown, or between the control bar and the outer end of the piston rod (not shown). When the double-acting cylinders 40 are activated to draw the piston rods in, therefore, the clamps 31 are pivoted out into their broken-line positions 31', while upon reverse activation of the cylinders 40, the clamps 31 are pivoted back in.

Figure 5:
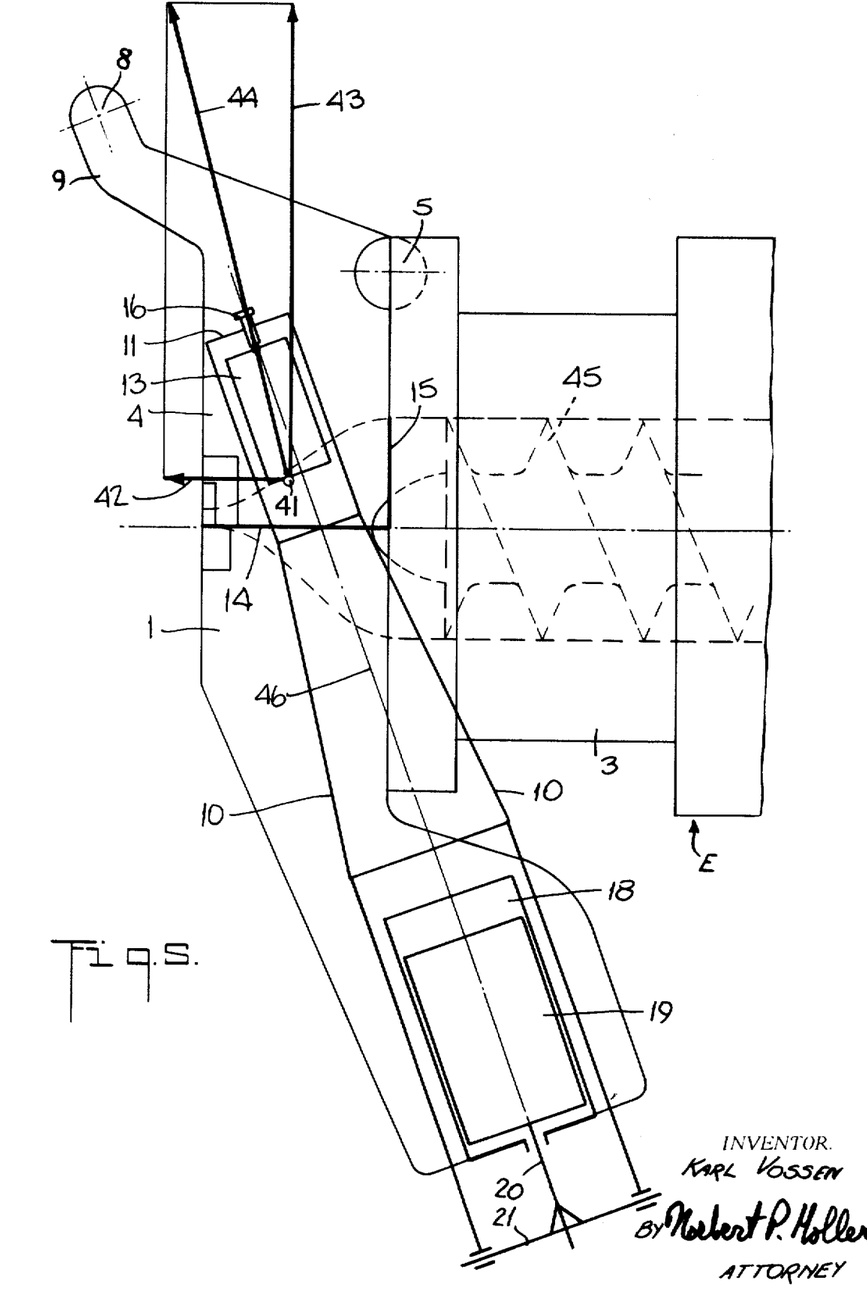
FIG. 5 is a fragmentary, diagrammatic side elevational view of an extruder with an openable diehead structure and illustrates the force diagram for the clamping arrangements according to the present invention.

FIG. 5 diagrammaticaly represents the relationship between the clamp orientation and the diehead forces to be established in accordance with the principles of the present invention, but it must be understood that although the representation is with reference to the construction illustrated in FIGS. 1 to 3, it applies equally to the construction of FIG. 4. The force diagram of FIG. 5 is based on the internal compressive forces occurring in operation in reference to the perpendicular positions of the sealing surfaces 14 and 15. The point 41 may be taken as the point of concentration of the perpendicular components 42 and 43 of the forces which are generated by the compression pressure on the material being worked in the extruder E by the screw 45. For any given working pressure in the interior of the extruder, the values of the forces 42 and 43 are largely determined by the value of the projection of the internal diehead surfaces which are bounded by the sealing surfaces 15 and 14, respectively. The directions of the forces 42 and 43 may be other than perpendicular, however, being always determined by the orientations of the sealing surfaces 15 and 14.

It will be clear that whenever the clamps 10 are given an oblique orientation such that their axes 46 lie in the direction of the resultant 44 of the forces 42 and 43, the tightening of the clamps produces both of the required sealing or pressing forces corresponding to and needed to counterbalance the forces 42 and 43. Inclining the axes 46 somewhat more, as illustrated in FIG. 5, enables the clamps in tightening additionally to apply such force as may be needed for overcoming the frictional forces which arise during the clamping operation especially at the sealing surface 14, whereby the possibility of self-locking of the diehead member 4 in an incompletely closed position is effectively avoided.

The tensional forces to be achieved in the tightening of the clamps are, of course, suitably chosen to be greater than the minima necessitated by the forces 42 and 43, i.e. the resultant 44, so as to insure that an appropriate safety factor exists. This safety factor may be, for example, about 1.4.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

Having thus described my invention, what I claim and desire to secure by Letters Patent is:

1. In an extruder having an openable diehead structure at the head of the machine, which diehead structure includes a stationary member fixed to said machine head, and a cooperating movable member which is subjected to a force having unbalanced components along and transverse to the extrusion path during operation of the extruder and is required, for purposes of an extrusion operation, to be closed with tight sealing against both said machine head and said stationary member; the improvement comprising releasable clamp means engageable with said movable member when the same is in its closed position, and power means connected with said clamp means for moving the latter into and out of force-transmitting engagement with said movable member, said clamp means, when in such engagement, being oriented obliquely relative to the extrusion path and generally in the direction of the resultant of the internal extrusion pressure-created force components acting on said movable member in specified directions bearing predetermined relationships to the respective contact surfaces between said movable member and said machine head on the one hand and between said movable member and said stationary member on the other hand.

2. In an extruder according to claim 1; said clamp means, when in said force-transmitting engagement with said movable member, being oriented at an angle of inclination to said extrusion path which is somewhat smaller than the angle of inclination of said resultant to said extrusion path, thereby to prevent self-locking between said movable and stationary members during the closing of the former.

3. In an extruder according to claim 1; said clamp means, when in said force-transmitting engagement with said movable member, being oriented in the direction of the resultant of said force components and the frictional forces arising between said movable and stationary members during the closing operation, thereby to prevent self-locking between said members.

4. In an extruder according to claim 1; said power means being arranged in the force transmission path extending from said movable member via said clamp means to an adjunct of said stationary member or said machine head.

5. In an extruder according to claim 1; said power means comprising fluid pressure-operated piston and cylinder means arranged so that the line of action thereof lies in the force transmission path extending from said movable member via said clamp means to an adjunct of said stationary member or said machine head.

6. In an extruder according to claim 5; said piston and cylinder means being interconnected between said clamp means and said adjunct of said stationary member or said machine head.

7. In an extruder according to claim 6; one component of said piston and cylinder means being rigidly secured to one of said clamp means and said adjunct, and the other component of said piston and cylinder means being articulated to the other of said clamp means and said adjunct, for enabling lateral inward and outward pivotal movements of said clamp means toward and away from said movable member.

8. In an extruder according to claim 7; control bar means operable on said clamp means for effecting said lateral inward pivotal movements of the latter prior to the engagement of said movable member by said clamp means under the action of said piston and cylinder means in one direction, and for effecting said lateral outward pivotal movements of said clamp means subsequent to the release of the latter from said movable member under the action of said piston and cylinder means in the opposite direction.

9. In an extruder according to claim 6; the cylinder component of said piston and cylinder means being rigidly secured to one of said clamp means and said adjunct, and the piston component of said piston and cylinder means being articulated to the other of said clamp means and said adjunct, for enabling lateral inward and outward pivotal movements of said clamp means toward and away from said movable member.

10. In an extruder according to claim 9; control bar means operable on said clamp means for effecting said lateral inward pivotal movements of the latter prior to the engagement of said movable member by said clamp means under the action of said piston and cylinder means in one direction, and for effecting said lateral outward pivotal movements of said clamp means subsequent to the release of the latter from said movable member under the action of said piston and cylinder means in the opposite direction.

11. In an extruder according to claim 6; said clamp means comprising at least one arm structure engageable at one end with a corresponding part of said movable member, said piston and cylinder means comprising at least one cylinder having a piston reciprocally slidable therein with a piston rod extending out of said cylinder from one face of said piston, said cylinder being rigidly affixed to said adjunct of said stationary member or said machine head so as to have the piston rod side of said piston facing away from said part of said movable member, and means defining an articulated joint between said piston rod and the other end of said arm structure for enabling lateral inward and outward pivotal movements of the latter toward and away from said movable member.

12. In an extruder according to claim 11; associated control bar means operable for effecting said lateral inward and outward pivotal movements of said arm structure upon activation of said piston so as to move said piston rod respectively away from and toward said part of said movable member, said control bar means comprising a linkage structure having at one end thereof a first pivotal connection at a stationary location and having at the other end thereof a second pivotal connection with said arm structure intermediate the ends of the latter, the location of said first and second pivotal connections being such that said linkage structure and the section of said arm structure between said second pivotal connection and said articulated joint together define an elbow lever system.

13. In an extruder according to claim 12; said second pivotal connection including means defining a slot-shaped opening for sliding pivot pin movement therealong, for enabling a limited degree of longitudinal movement of said arm structure both prior to each lateral outward pivotal movement thereof and subsequently to each lateral inward pivotal movement thereof.

14. In an extruder according to claim 13; said movable member being provided with at least one laterally protruding lug having a spherically-curved socket in its upper surface, and said arm structure being provided at said one end thereof with a downwardly facing correspondingly spherically-curved projection adapted to seat in said socket during a clamping operation, said projection being substantially linearly lowered into and raised out of said socket during respective longitudinal movements of said arm structure.

15. In an extruder according to claim 14; said arm structure being in the form of a generally U-shaped yoke the open end of which is articulated to said piston rod and the closed end of which is adapted to overlie the respective lug of said movable member, said projection being constituted by the tip section of an adjustable set screw carried by said yoke at the transverse portion thereof defining the closed end of said yoke, the tip of said set screw facing toward said open end of said yoke.

16. In an extruder according to claim 13; spring-pressed abutment means in continuous engagement with said arm structure and operable both for limiting the lateral outward pivotal movement thereof and for biasing said arm structure towad said movable member.

17. In an extruder according to claim 6; said clamp means comprising at least one arm structure engageable at one end with a corresponding part of said movable member, said piston and cylinder means comprising at least one cylinder having a piston reciprocally slidable therein with a piston rod extending out of said cylinder from one face of said piston, said cylinder being rigidly affixed to the other end of said arm structure so as to have the piston rod side of said piston facing toward said part of said movable member, and means defining an articulated joint between said piston rod and said adjunct of said stationary member or said machine head for enabling lateral inward and outward pivotal movements of said arm structure toward and away from said movable member concomitantly with respective longitudinal movements of said arm structure upon appropriate activation of said cylinder so as to move the same respectively away from and toward said part of said movable member.

18. In an extruder according to claim 17; associated control bar means operable for effecting said lateral inward and outward pivotal movements of said arm structure, said control bar means comprising an extension secured to said cylinder, and a fluid pressure-operated piston and cylinder combination articulated between said extension and another location.

19. In an extruder according to claim 18; said movable member being provided with at least one laterally protruding lug having an upper surface inclined somewhat downwardly toward said movable member, and said arm structure being in the form of a bow generally concave toward said movable member and provided at said one end thereof with a hook portion directed toward said movable member and having a bottom face adapted to engage end seat on said upper surface of said lug, said hook portion being substantially linearly lowered into and raised out of engagement with said upper surface of said lug during respective longitudinal movements of said bow.

References Cited
UNITED STATES PATENTS

| 1,832,856 | 11/1931 | Brundage | 18—17 |
| 1,932,063 | 10/1933 | Brown et al. | 18—17 |
| 1,947,202 | 2/1934 | Homeirer | 18—12 |
| 2,200,871 | 5/1940 | Bosomworth | 18—17 |
| 2,486,474 | 11/1949 | Henning | 18—12 XR |
| 2,655,710 | 10/1953 | Roensch et al. | 18—17 XR |
| 2,897,543 | 8/1959 | Weston et al. | 18—12 XR |
| 3,304,579 | 2/1967 | Ashworth | 18—12 |
| 3,407,441 | 10/1968 | Vigansky et al. | 18—12 |

FOREIGN PATENTS 592,409   3/1959   Italy.

J. SPENCER OVERHOLSER, Primary Examiner

R. S. ANNEAR, Assistant Examiner

U.S. Cl. X.R.

164—341